US00RE47676E

(19) United States
(12) Reissued Patent
Foote et al.

(10) Patent Number: US RE47,676 E
(45) Date of Reissued Patent: Oct. 29, 2019

(54) METHOD AND APPARATUS FOR CONTROLLING A DISPLAY OF DATA ON A DISPLAY SCREEN

(71) Applicant: SYNAPTICS INCORPORATED, San Jose, CA (US)

(72) Inventors: Geoffrey Foote, Cambridge (GB); David W. Gillespie, Los Gatos, CA (US)

(73) Assignee: WACOM CO., LTD., Saitama (JP)

(21) Appl. No.: 14/061,893

(22) Filed: Oct. 24, 2013

Related U.S. Patent Documents

Reissue of:
(64) Patent No.: 6,904,570
Issued: Jun. 7, 2005
Appl. No.: 09/877,411
Filed: Jun. 7, 2001

(51) Int. Cl.
*G06F 3/033* (2013.01)
*G06F 3/041* (2006.01)
*G06F 3/048* (2013.01)
*G06F 3/0488* (2013.01)

(52) U.S. Cl.
CPC ..... *G06F 3/0488* (2013.01)

(58) Field of Classification Search
CPC ... G06F 3/00; G06F 3/01; G06F 3/033; G06F 3/038; G06F 3/041; G06F 3/048; G06F 3/0481; G06F 3/04812; G06F 3/016; G06F 3/04883; G06F 3/04842; G06F 3/0346; G06F 1/1626; G06F 3/0488; G06F 3/03545; G06F 3/0386
USPC ..... 715/701, 702, 708, 711, 715, 764, 856, 715/863, 864, 865; 345/156–158, 169, 345/173, 179, 180
See application file for complete search history.

(56) References Cited

U.S. PATENT DOCUMENTS

| | | | | | |
|---|---|---|---|---|---|
| 4,817,034 | A | | 3/1989 | Hardin, Sr. et al. | 345/173 |
| 5,149,919 | A | * | 9/1992 | Greanias et al. | 178/18.02 |
| 5,347,295 | A | | 9/1994 | Agulnick et al. | 345/156 |
| 5,805,164 | A | * | 9/1998 | Blum et al. | 715/808 |
| 5,861,583 | A | | 1/1999 | Schediwy et al. | 178/18.06 |
| 5,923,327 | A | * | 7/1999 | Smith et al. | 715/784 |
| 5,995,101 | A | * | 11/1999 | Clark | G06F 3/04895 715/711 |
| 6,054,979 | A | * | 4/2000 | Sellers | G06F 1/3203 345/173 |
| 6,133,906 | A | * | 10/2000 | Geaghan | 345/179 |

(Continued)

FOREIGN PATENT DOCUMENTS

| | | | | |
|---|---|---|---|---|
| EP | 0802476 A2 | * | 10/1997 | G06F 3/033 |
| EP | 0996052 | | 4/2000 | G06F 3/033 |

(Continued)

OTHER PUBLICATIONS

Mark Hachman, "Write Touch Goes Cordless", 1995, Electronic Buyer's News, n 963, p. 41.*

(Continued)

*Primary Examiner* — Peng Ke
(74) *Attorney, Agent, or Firm* — Seed IP Law Group LLP

(57) ABSTRACT

A user interface of a smart compact device employs a combination comprising a display screen in combination with an activating object that is capable of reporting X and Y position information in a first state and a second state. Selected data is displayed or hidden depending on whether the first state or second state is detected.

56 Claims, 12 Drawing Sheets

(56) References Cited

U.S. PATENT DOCUMENTS

| | | | | |
|---|---|---|---|---|
| 6,236,396 | B1 | 5/2001 | Jenson et al. | 345/764 |
| 6,424,338 | B1 | 7/2002 | Anderson | 345/173 |
| 6,429,846 | B2 | 8/2002 | Rosenberg et al. | 345/156 |
| 6,483,526 | B1 * | 11/2002 | Merrick | 715/780 |
| 6,486,874 | B1 * | 11/2002 | Muthuswamy | G06F 3/04883 178/18.01 |
| 6,492,979 | B1 * | 12/2002 | Kent et al. | 345/173 |
| 6,563,514 | B1 | 5/2003 | Samar | 345/711 |
| 6,587,587 | B2 * | 7/2003 | Altman et al. | 382/181 |
| 6,614,422 | B1 * | 9/2003 | Rafii et al. | 345/168 |
| 6,674,425 | B1 * | 1/2004 | Louis et al. | 345/173 |
| 6,930,672 | B1 * | 8/2005 | Kuribayashi | G06F 3/04883 178/18.01 |
| 2003/0122774 | A1 * | 7/2003 | Harada | G06F 3/0481 345/156 |
| 2003/0137522 | A1 * | 7/2003 | Kaasila | G06T 3/4015 345/619 |
| 2006/0004874 | A1 * | 1/2006 | Hutcheson | A63F 13/12 |

FOREIGN PATENT DOCUMENTS

| | | | |
|---|---|---|---|
| WO | WO99/54807 | 10/1999 | G06F 3/033 |
| WO | WO00/28407 | 5/2000 | G06F 3/033 |
| WO | WO00/33244 | 6/2000 | G06K 11/16 |

OTHER PUBLICATIONS

Jeff Angus, "Gliffic Plus Desk Set offers mouse and cordless pen", Feb. 1994, InfoWorld, v16, n7, p. 99(1).*

* cited by examiner

METHOD AND APPARATUS FOR CONTROLLING A DISPLAY OF DATA ON A DISPLAY SCREEN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The invention relates generally to smart compact devices, and specifically to the display and manipulation of information on such devices by the use of [a pen] *an* input system capable of sensing the proximity of [the] *an input object such as a finger or a* pen.

There are now many computerized devices capable of storing and accessing large amounts of data that employ quite compact displays. Examples of such smart compact devices are smart handheld devices, such as PDAs and smartphones. Other smart compact devices may be kiosks or other equipment that is physically large, but with displays that are compact compared to those of traditional computers. These smart compact devices are commonly used for storing and accessing personal data such as contact addresses and calendar information. A smart compact device has an operating system running on a microprocessor, a display screen, and a pointing device configured to accept input from an activating object, such as a finger, pen, and the like. The pointing device is used to input to or to control the actions of the operating system through a user interface. The display screen is typically an LCD module, and the pointing device is, for example, a resistive touchscreen. The operating system is typically an event driven operating system with a graphical user interface, such as a windowing operating system, but may also be a text-based user interface.

A graphical user interface typically is made up from screen objects, which can be control objects, such as scroll bars, combo boxes, buttons and drop down lists; data objects, such as text windows and bitmapped images; and combinations of the two, such as hyperlinks within text. The user can store and retrieve information from the smart compact device by manipulating the screen objects of the graphical user interface with the pointing device. Control objects often have a control action associated with them, such as closing a window, or opening a file.

The graphical user interface on a smart compact device is often derived from graphical user interfaces that are well known on desktop computers, where the pointing device is often a mouse or a touchpad. A key difference between desktop computers and smart compact devices is that the display screen on a smart compact device is typically 320×240 pixels or less in size. This small size makes it difficult to present the data stored in the smart compact device in an easy to use way.

A second key difference is that the graphical user interface of a desktop computer is typically driven by a pointing device that is capable of generating both X and Y position data, and one or more bits of status information. An example of this status information is mouse button state. The pointing device on a smart compact device can usually only provide X and Y position data in one state, for example the position where the user has touched a resistive touchscreen.

Techniques that are used in the graphical user interfaces of desktop computers to manage large amounts of data on a display screen include multiple overlapping windows and pop-up data, which provides extra information about control and data objects in a graphical user interface when the mouse pointer is positioned over them. An example of an implementation of pop-up data is Microsoft's ToolTips.

Multiple overlapping windows are of little use on a smart compact device, since the overhead of window borders, title bars etc., become prohibitive on a small display screen. Pop-up data relies on the pointing device being able to provide at least two states with X and Y position data, so that a screen object may be pointed to trigger the pop-up data, and then selected. Existing pointing devices on smart compact devices do not have this capability, and so pop-up data is difficult to implement in a user-friendly manner.

Attempts have been made to implement pop-up data on smart compact devices using a pointing device that has only one X and Y position state. Microsoft's PocketPC generates pop-up data in some situations if the activating object of the pointing device is held on and touches a control object for a period of time. An alternative implementation is described in Patent Application EP 0 996 052 A2, where tapping on the pointing device switches modes to display pop-up data. Neither of these approaches is intuitive for the user, and so pop-up data implemented in this way detracts from the usability of the smart compact device.

A further challenge with the user interface of a smart compact device is that smart compact devices, unlike desktop computers, are generally used in a variety of environments, and often ease of use and quick access to data is of paramount importance. A standard measure of the usability of the user interface of a smart compact device is the number of taps or other discrete actions that a user must make to perform a specific task (e.g. dialing a phone number).

Pointing devices that are capable of generating X and Y position data while reporting several status bits are well known in desktop computers. In addition to the standard mouse, inductive graphics tablets are common. Also, inductive pen sensing systems have been used for pen-based tablet computers, which are characterized by a large form factor. The use of an inductive pen system in a small form factor device, such as a PDA, has also been disclosed in WO 00/33244. In all these cases the pen system is capable of generating X and Y position data with several status bits, where the status bits may depend on whether the pen is touched to the screen or not. [The] *In the context of these prior art systems, the* ability to report X and Y position while not touching the screen is *sometimes* referred to as proximity sensing.

In these prior art systems, the proximity information has only been used to mimic the status information available from mouse buttons. No inventive extensions to the User Interface of either desktop computers or smart compact devices have been made that use proximity information in a novel way to enhance usability. Specialized niche applications, such as varying spray density of the aerosol tool in a graphics package, are the extent of the applications to date.

BRIEF DESCRIPTION OF THE INVENTION

The present invention provides [a means] *devices and methods* for manipulating the presentation of data in the user interface of a smart compact device, using information provided by the smart compact device's pointing device, *such as a touchscreen, and its interaction with an input object, such as a finger.*

The invention allows a screen object to be displayed on the display screen, and pop-up data associated with the screen object to be accessed. The user accesses the pop-up data by manipulating the pointing device in an intuitive manner, *for example, by hovering a finger over a screen object to be accessed*. The novel use of pop-up data on a smart compact device to allow simple and easy access to large amounts of data is a key advantage of the invention.

It is a further advantage that the invention is intuitive in use for both novice and experienced device users.

BRIEF DESCRIPTION OF THE DRAWING FIGURES

Referring now to the figures, wherein like elements are numbered alike:

FIG. [3] *3A* is a diagram illustrating the present invention.

Figure 3:
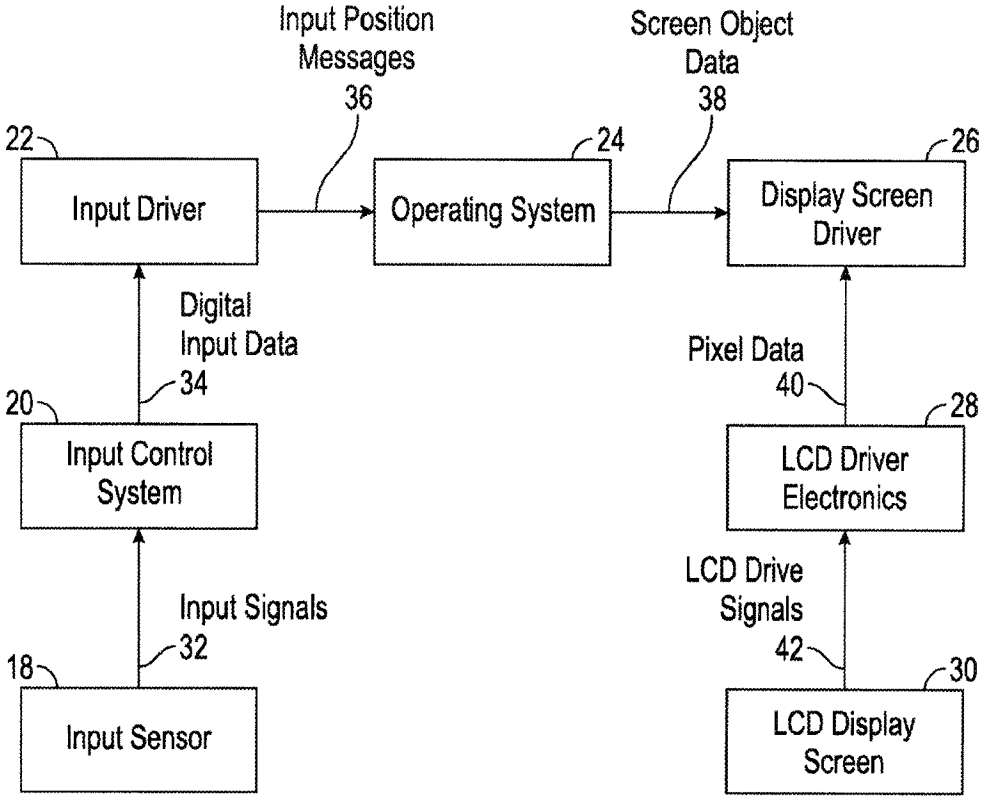
Figure 3A:
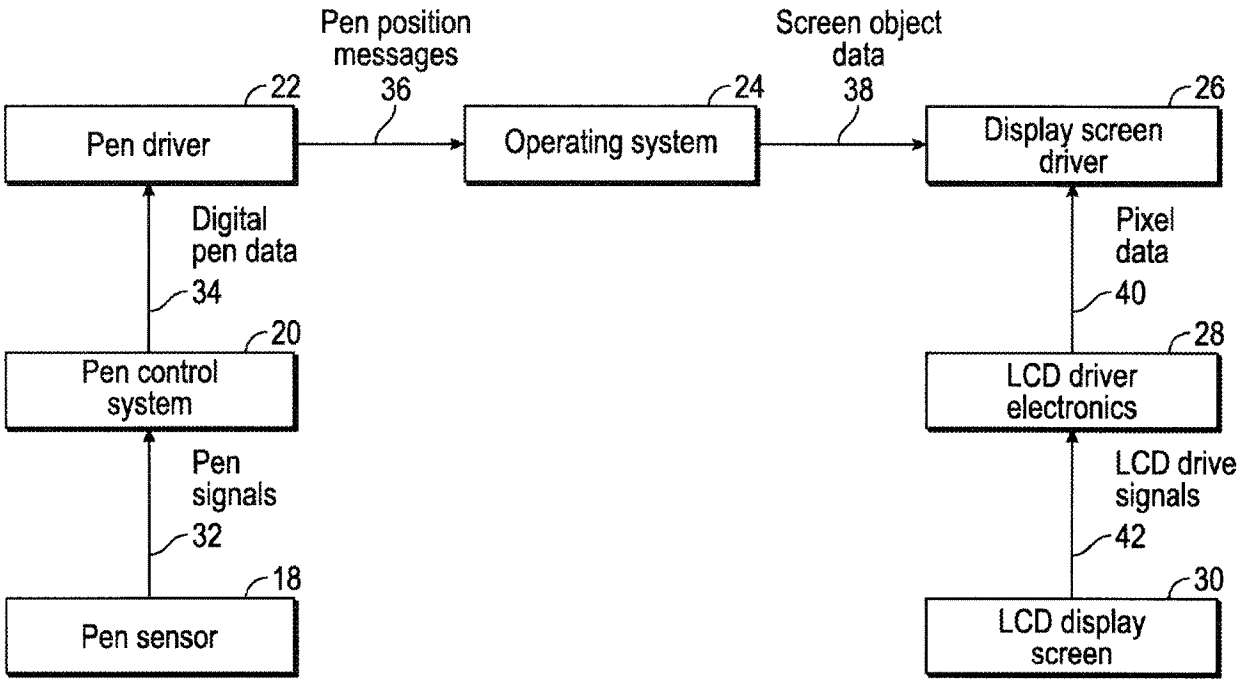
Figure 3B:
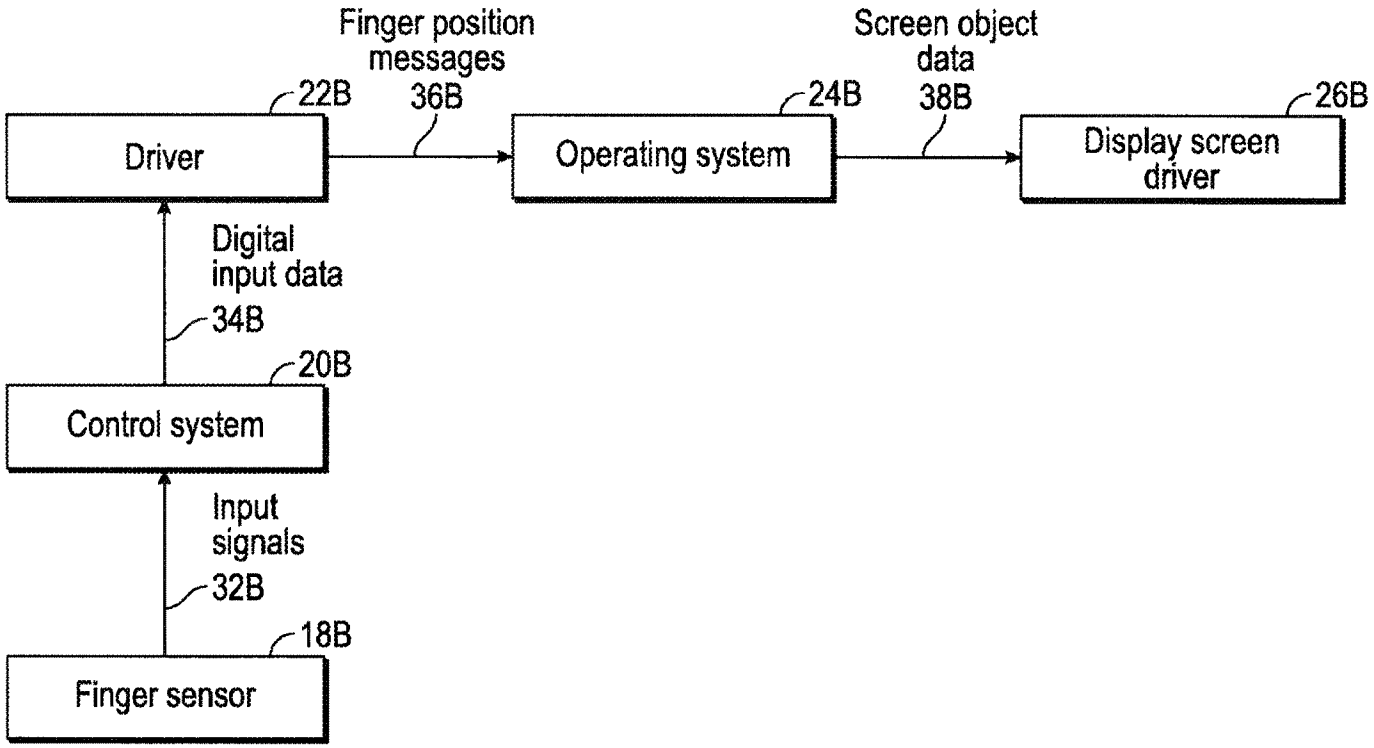

*FIG. 3B is a diagram illustrating an alternative embodiment of FIG. 3A.*

Figure 4:
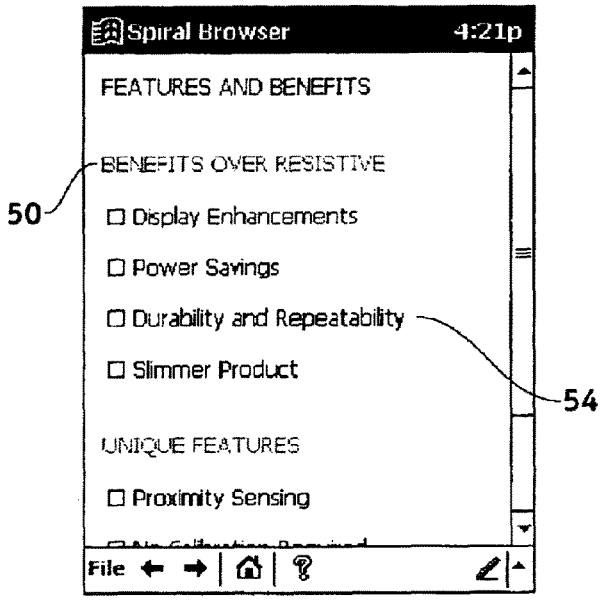

FIG. 4 shows a typical screen object in the form of a hyperlink.

Figure 5:
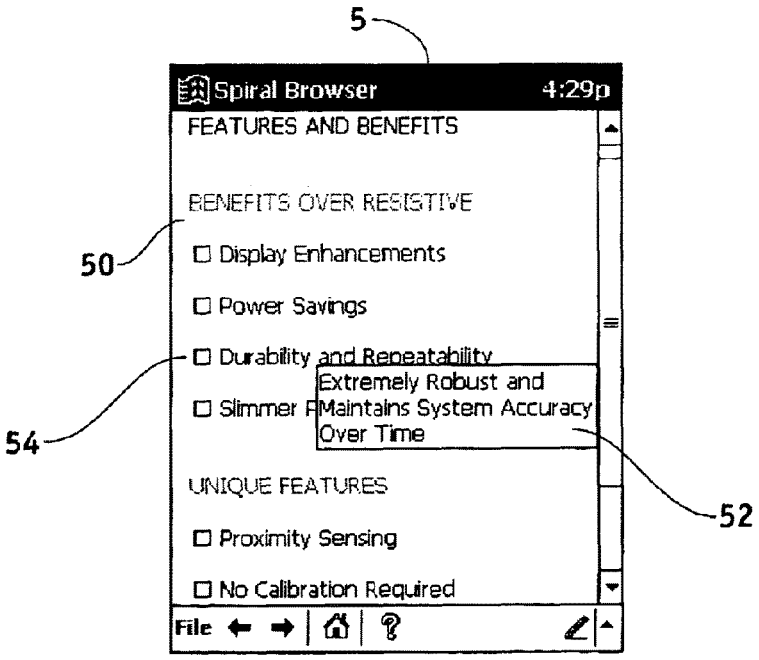

FIG. 5 shows the screen object of FIG. 4, and its associated pop-up data that has been triggered by holding (*hovering*) the activating object above the hyperlink.

Figure 6:
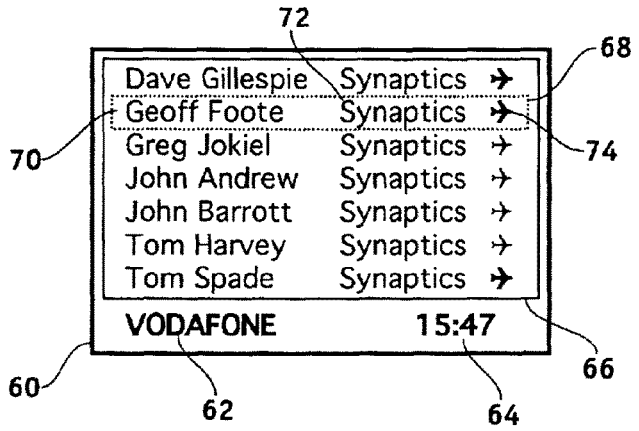

FIG. 6 shows a typical small display screen on a smartphone showing device status information and a window with directory information containing screen objects such as the contact name, the contact company and an icon intended to trigger the dialing process.

Figure 7:
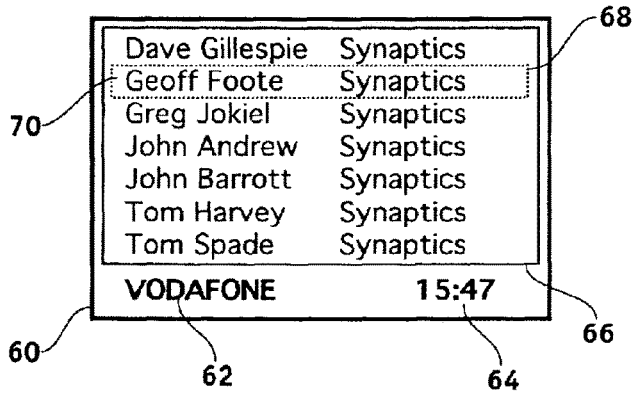

FIG. 7 shows an alternate small display screen on a smartphone, where the contacts do not have a dial icon associated with them.

Figure 8:
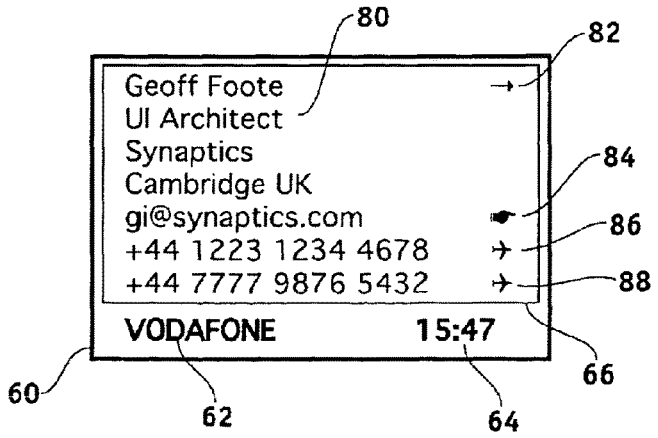

FIG. 8 shows typical data stored for each contact entry in a smartphone including both detailed contact information, and control objects in the form of icons which allow dialing the contact, sending email, or returning the display to the directory listing of FIG. 7.

Figure 9:
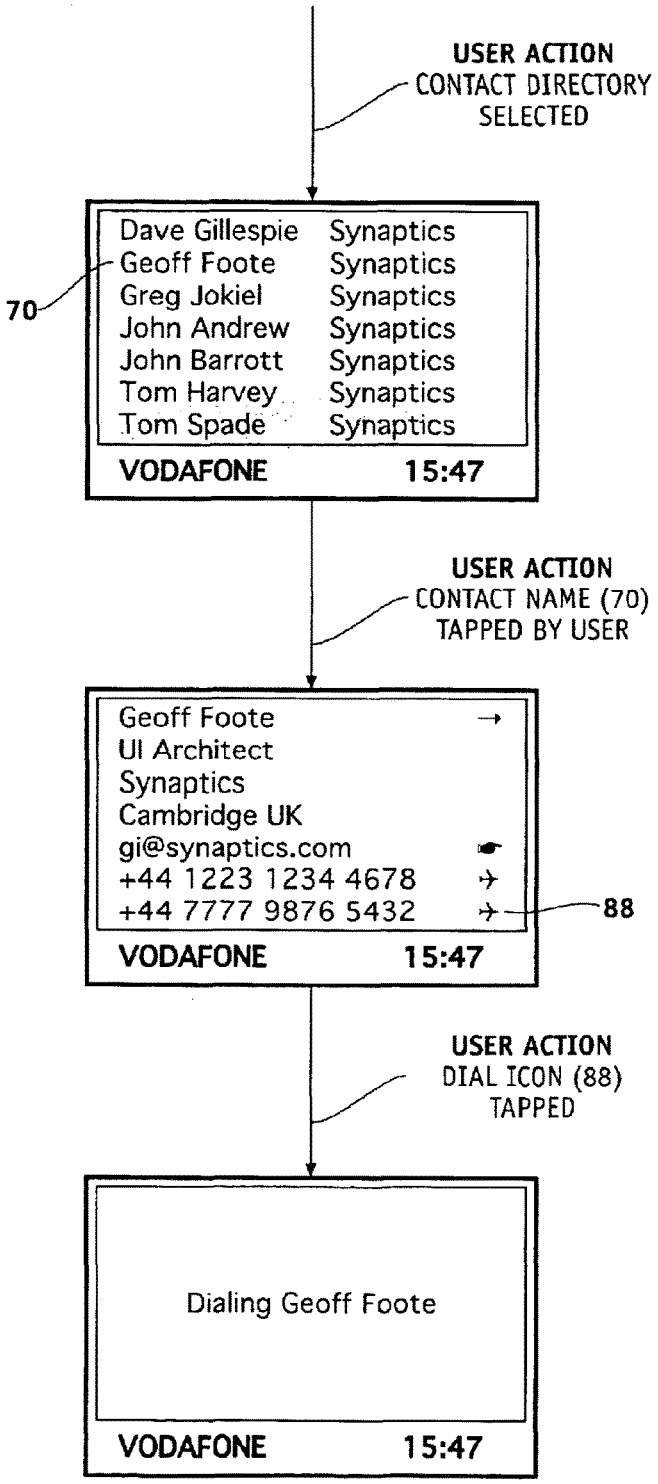
FIG. 9 (PRIOR ART)

FIG. 9 illustrates a prior art process of dialing a contact from the directory.

Figure 10:
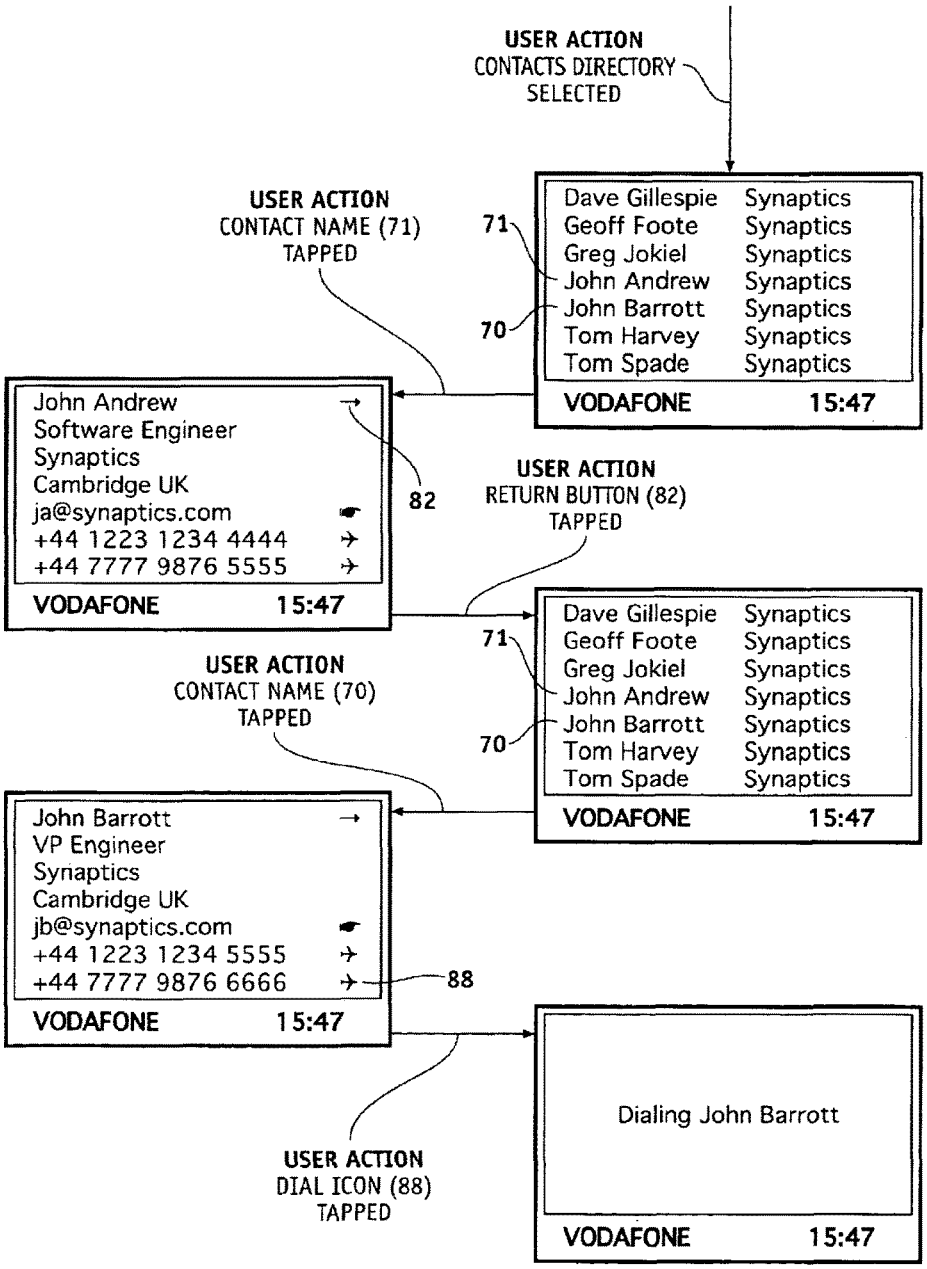
FIG. 10 (PRIOR ART)

FIG. 10 illustrates a typical prior art process for dialing a number when the contact name is ambiguous.

Figure 11:
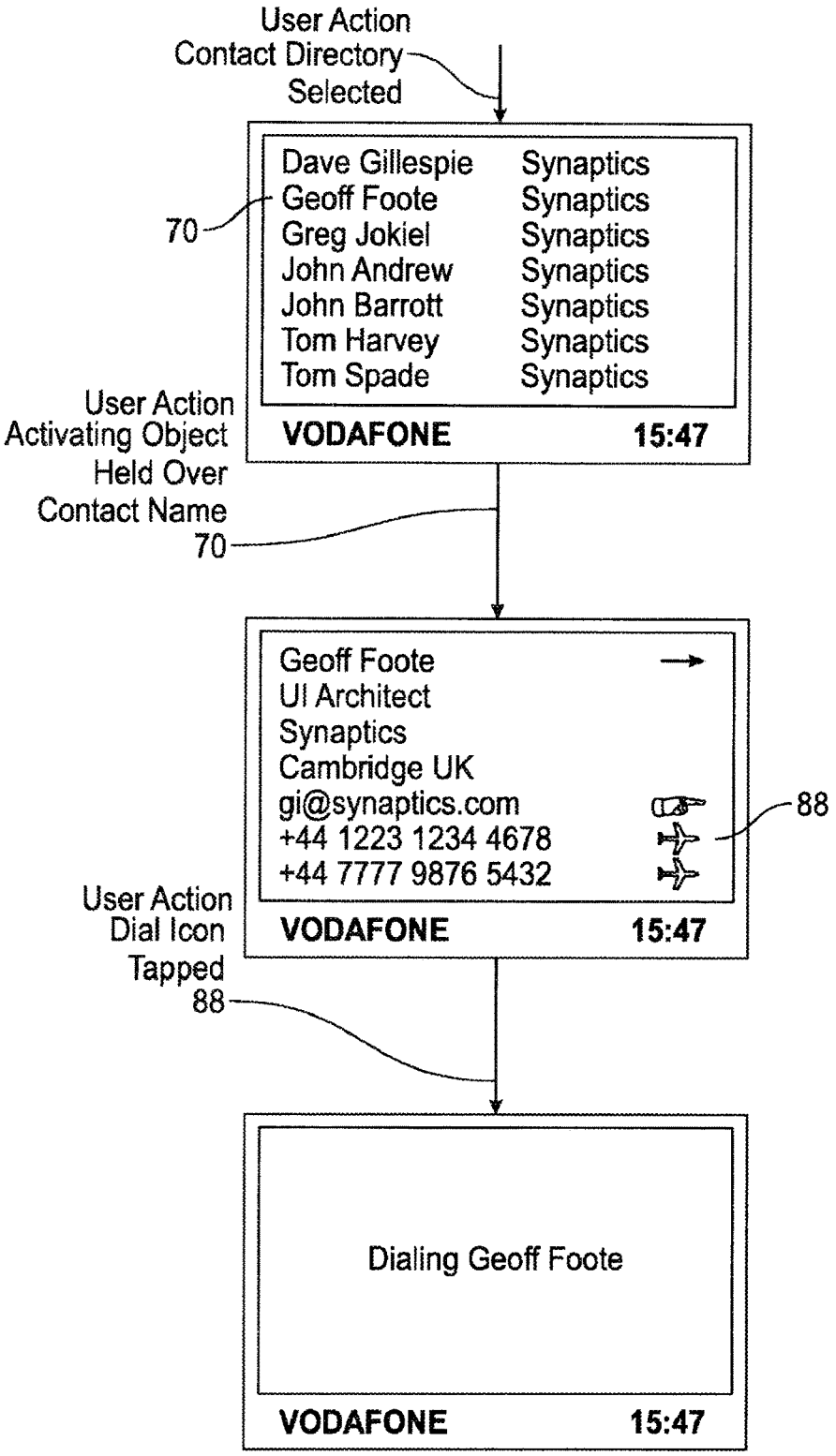

FIG. 11 shows a process for dialing a number according to the present invention.

Figure 12:
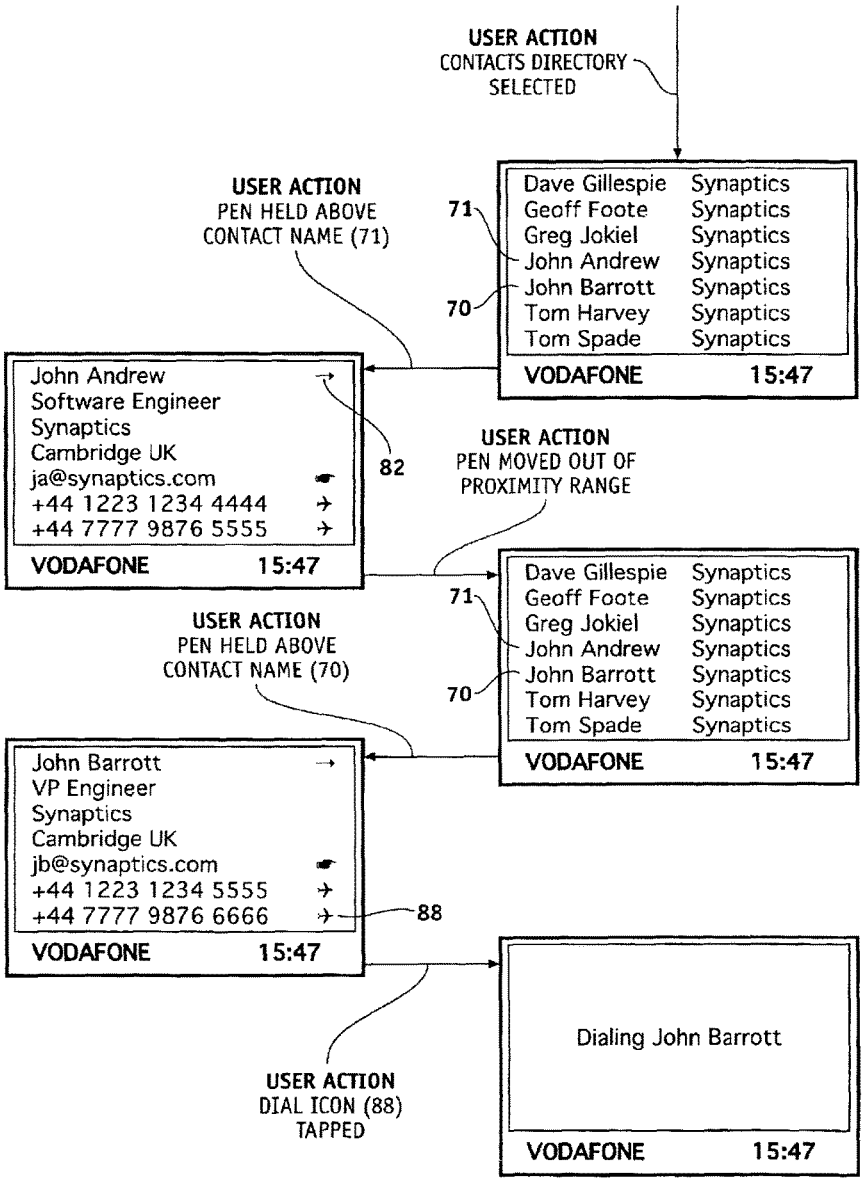

FIG. 12 shows a process for dialing a number according to the present invention in the case of ambiguous names.

Figure 13:
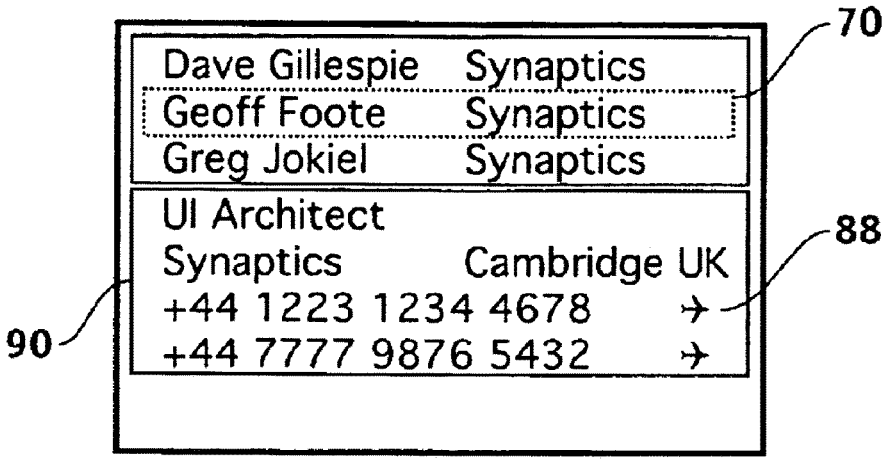

FIG. 13 illustrates a display according to an alternative embodiment, in which the pop-up data does not have to take up the whole display screen of the smart compact device, but can be displayed on a part of the display.

Figure 14:
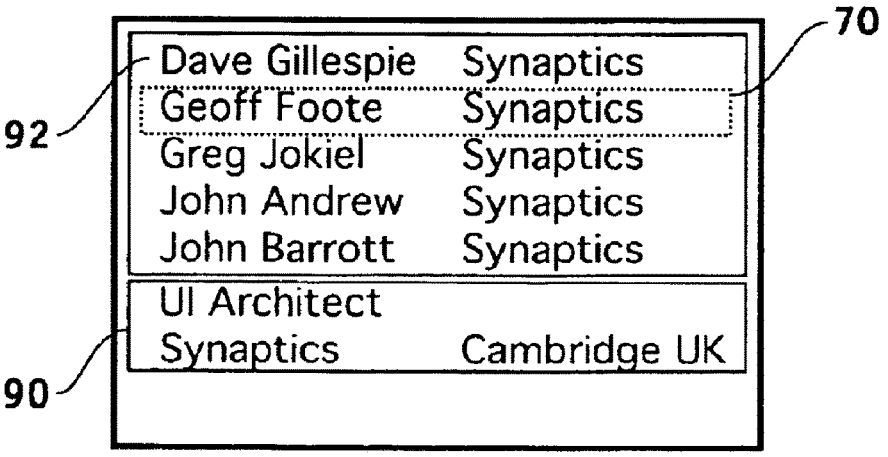

FIG. 14 illustrates a display according to an alternative embodiment.

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons having the benefit of this disclosure.

Figure 1:
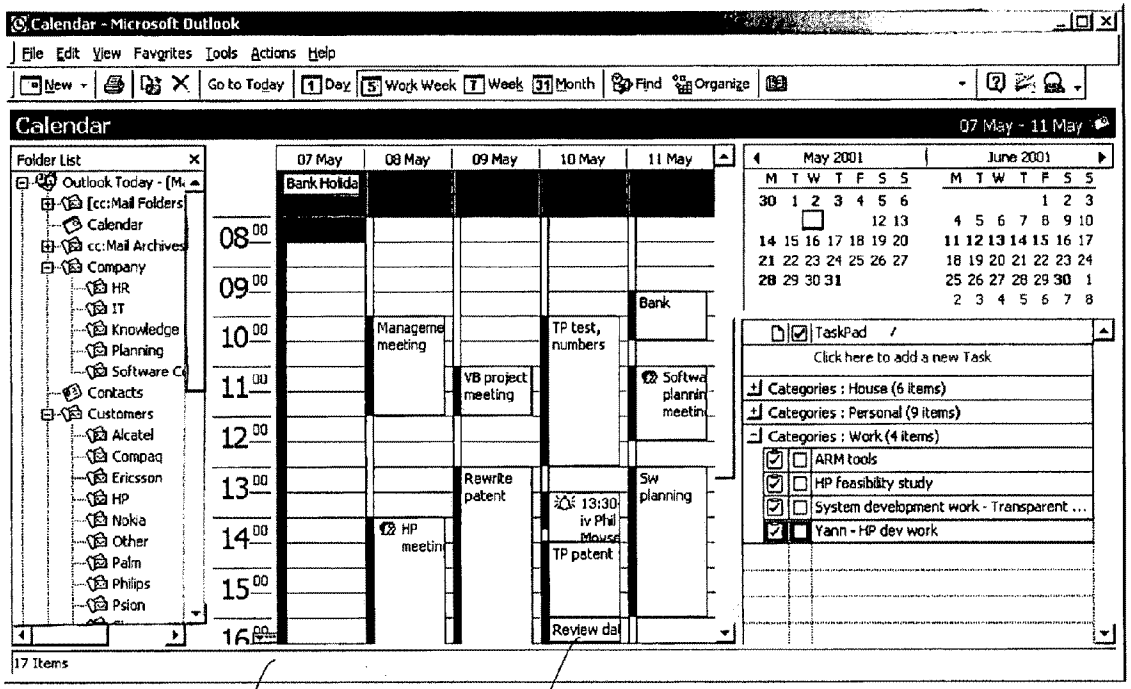
FIG. 1 (PRIOR ART)
FIG. 1 is a diagram showing a typical prior art window on the display screen of a computer, with a typical screen object.
Figure 2:
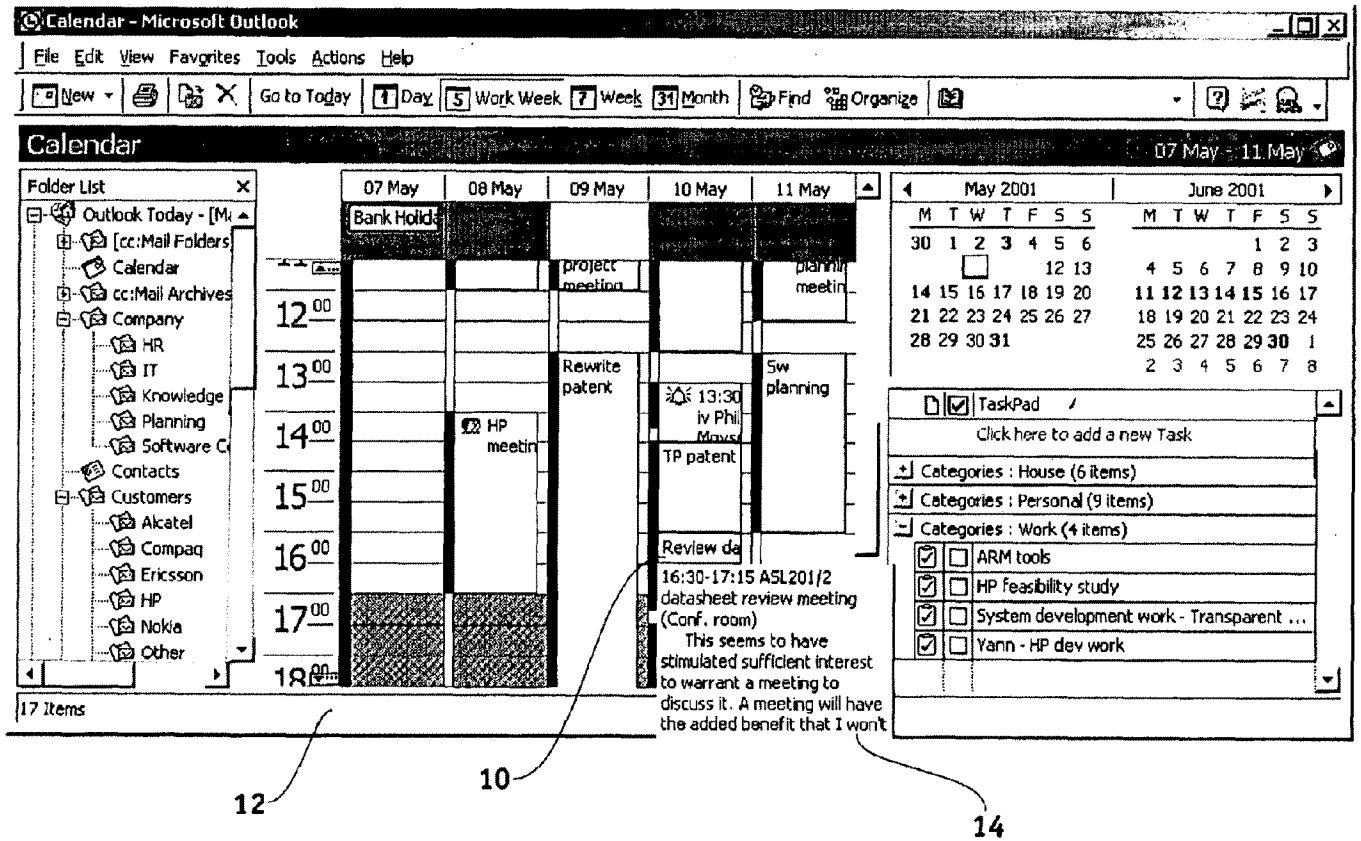
FIG. 2 (PRIOR ART)
FIG. 2 is a diagram showing prior art pop-up data, which is displayed when the cursor associated with the pointing device has been held over the screen object for a short period of time.

The prior art of pop-up data on a desktop computer is shown by FIGS. 1 and 2. FIG. 1 shows a typical window on the display screen 12 of the computer, with a typical screen object 10. FIG. 2 shows the pop-up data 14, which is displayed when the cursor associated with a pointing device (a mouse) has been held over the screen object 10 for a short period of time.

The invention is shown diagrammatically in FIG. 3. In an illustrative embodiment, the enhanced pointing device may be an inductive [pen] *or capacitive* input system *for use with a pen, finger, or the like*, comprising a [pen] sensor 18 and a [pen] control system 20, [such as] *generally analogous to* that described in publication WO 00/33244, entitled "Position Sensor". This system has the key advantage that it can provide X and Y position data both when the activating object is touching the display screen and when it is held in close proximity to, but not touching (*i.e., hovering over*), the display screen, and is able to distinguish between the two states. Alternatively, the first state may require a firm touch while the second "nontouching" state may occur even when the activating object is lightly touching the display screen.

In an alternative embodiment, such an enhanced pointing device could also be a capacitive touchpad, capable of sensing an activating object, such as a finger, pen, and the like, in close proximity to its surface, as well as when touched to the surface.

In a further alternative embodiment, the enhanced pointing device could be any device capable of providing X and Y position data, and two or more states associated with that data, those states being a base state (corresponding to a mouse pointer position with no buttons pressed, or an activating object in close proximity to, but not touching a display screen), a selected state (corresponding to a mouse pointer position with the left button clicked, or an activating object touched to the display screen of a smart compact device), and zero or more further extended states (corresponding, for example, to a mouse with the right button clicked, or an activating object with a side button held in).

In a further alternative embodiment, the enhanced pointing device is an inductive pen input system (or inductive sensing system) that is capable of providing X and Y position data, a base state, a selected state, and zero or more extended states, where the extended states are related to the distance of the activating object from the sensor.

In a further alternative embodiment, the enhanced pointing device is a device capable of providing X and Y position data, a base state, a selected state, and extended states, where the extended states are selected by a user-controlled parameter of the enhanced pointing device.

In an illustrative embodiment, the pen *or finger* control system 20 is driven by a [pen] driver 22, which can be software running on the microprocessor of the smart compact device. This [pen] driver 22 converts the [pen] *input* data 34 from the sensor system into [pen] *input object* position messages 36, formatted according to the requirements of the operating system 24. These messages 36 contain both the X and Y position data, and flags to signal which one of the states the pen system is reporting.

In an alternative embodiment, the software running on the smart compact device may be structured in a manner other than that shown in FIG. 3, as long as it is one that reports the activating object's position to the appropriate component of the compact device, such as the operating system or the user interface.

In an illustrative embodiment, the operating system 24 processes the pen *or finger* position message, and alters the visible state of any appropriate screen object according to the state of the activating object as reported in the [pen] position message. If the activating object has been held above a screen object for more than a short length of time (for example, a short length of time being typically 1 second or less), the operating system will change the data displayed on the screen so that the pop-up data is displayed. FIG. 4 shows a typical screen object 50, and a hyperlink 54. FIG. 5 shows the same screen object 50, and its associated pop-up data 52 that has been triggered by holding the activating object above the hyperlink 54.

In an alternative embodiment, the pop-up data can be triggered immediately when the activating object is held over the screen object. Such an embodiment can be used, for example, to enable a user to easily dial the correct number from the contacts directory of a smartphone or similarly enabled portable device.

In an alternative embodiment, the selected data is displayed or hidden depending on whether the first state or the second state is detected. Information on the display screen is controlled in response to the presence of an activating object. At least a portion of the information can be selectively hidden and/or displayed in response to whether the activating object is in the first state or the second state.

*FIG. 3B is an alternative embodiment generally analogous to FIG. 3A, except that FIG. 3B illustrates the invention in the context of a capacitive touchpad capable of sensing a finger in close proximity to its surface, as well as when touched to the surface. In FIG. 3B the enhanced pointing device is a capacitive finger sensor 18B as opposed to the pen sensor 18 of FIG. 3A. As in FIG. 3A, the control system 20B can provide X and Y position data both when the finger is touching the display screen and when it is held in close proximity to, but not touching, the display screen, and is able to distinguish between the two states. Alternatively, the first state may require a firm touch while the second "nontouching" state may occur even when the finger is lightly touching the display screen.*

*With continued reference to FIG. 3B, the control system 20B is driven by a driver 22B, which can be software running on the microprocessor of the touchpad. This driver 22B outputs finger position messages 36B, formatted according to the requirements of the operating system 24B. These messages 36B contain both the X and Y position data, and flags to signal which one of the states the system is reporting.*

*In an alternative embodiment, the software running on the capacitive touchpad may be structured in a manner other than that shown in FIG. 3B, as long as it is one that reports finger position to the appropriate component of the touchpad device, such as the operating system or the user interface.*

*In the embodiment illustrated in FIG. 3B, the operating system 24B processes the finger position message, and alters the visible state of any appropriate screen object according to the state of the finger as reported in the finger position message 36B. If the finger has been held above a screen object for more than a short length of time (for example, a short length of time being typically 1 second or less), the operating system will change the data displayed on the screen so that the pop-up data is displayed.*

*In an alternative embodiment, the pop-up data can be triggered immediately when the finger is held over the screen object. Such an embodiment can be used, for example, to enable a user to easily dial the correct number from the contacts directory of a smartphone or similarly enabled portable device.*

*In an alternative embodiment, the selected data is displayed or hidden depending on whether the first state or the second state is detected. Information on the display screen is controlled in response to the presence of a finger. At least a portion of the information can be selectively hidden and/or displayed in response to whether the finger is in the first state or the second state.*

FIG. 6 shows a typical small display screen on a smartphone. The display screen 60 as depicted in FIG. 6 shows device status information 62,64 and a window 66 containing directory information. Within the window 66, the directory information is shown as lines 68, each containing screen objects, such as the contact name 70, the contact company 72 and an icon 74 intended to trigger the dialing process. An alternative embodiment to this screen is shown in FIG. 7, where the contact names 70 do not have a dial icon associated with them.

The data displayed on this screen is a summary or abstraction of the data held in the smart compact device about each contact. Typically, each contact will have at least the data illustrated in FIG. 8 stored. The window 66 in FIG. 8 is displaying both detailed contact information 80, and control objects in the form of icons, which allow dialing the contact 86 and 88, sending email 84 or returning the display to the directory listing 82 of FIG. 7.

In the prior art smart compact devices that use a resistive touch screen as a pointing device, the process of dialing a contact from the directory would typically involve the steps shown in FIG. 9. The user would select the display of the directory, tap the desired contact name 70, and then tap the dial icon 88 in the detailed display screen. This involves three discrete user actions.

In an alternative prior-art embodiment, tapping a dial icon in the directory listing (reference numeral 74 in FIG. 6) would dial a number directly. This has two key disadvantages. Firstly, there will usually be more than one number or contact method associated with each contact, so accessing a detailed screen would still be necessary. Secondly, the small amount of abstracted data visible on the directory screen is not always sufficient to uniquely identify the desired contact.

FIG. 10 illustrates a typical prior-art process for dialing a number when the contact name may be ambiguous. If the desired contact 70 has the same first name and company as another contact 71, the wrong contact may be selected initially. Then the user has to click the return icon 82 to return to the directory listing (or perform a similar 'undo' action). Then the correct desired contact 70 must be selected, followed by the selection of the dial icon 88 of the correct contact. This process takes five discrete user actions.

In the present invention, the process is simplified for the user. FIG. 11 shows a process according to the present invention. The contacts directory is selected, the activating object is held stationary above the desired contact name 70, which triggers the pop-up data and displays the detailed contact information. As part of the same movement the user taps the dial icon 88 to initiate the dialing sequence. This process involves only two discrete user actions, together with a natural, intuitive movement of the activating object.

In the case of ambiguous names, the process of FIG. 12 is followed. Once the contacts directory is selected, the activating object is held above the incorrect contact name 71, triggering the pop-up data with the full contact details. Instead of having to tap the return icon 82, the user simply moves the activating object out of the proximity range, and then holds it over the correct contact name 70. The pop-up data shows the detailed information, and the user can tap on the dial icon 88, initiating dialing. The complete process takes only three discrete user actions, together with a natural intuitive movement of the activating object.

In an alternative embodiment, the removal of the pop-up data may be signaled by another user action, such as the movement of the activating object outside the area of the display screen occupied by the pop-up data.

It will be recognized by those skilled in the art that the present invention is not limited to use with a contacts directory, but can be used for any application that requires an abstracted display of detailed data, and ready access to the detailed data.

In an alternative embodiment, the pop-up data does not have to take up the whole display screen of the smart compact device, but can be displayed on a part of the display. FIG. 13 illustrates such a display. The activating object is held above the desired contact name 70, which is then highlighted, triggering the pop-up data containing contact details 90 in the lower section of the screen. Moving the activating object to another contact name will cause the pop-up data to change to details of the new contact, and dialing the contact can be initiated by tapping the dial icon 88. This embodiment has the advantage that the context of the contact name can be seen together with the contact details. In this embodiment, the popup data is not removed when the activating object is moved away from the display screen, but remains until an action icon has been selected, pop-up data has been triggered from another contact name, or another application is selected on the smart compact device.

In a further alternative embodiment, the directory listing takes the form of FIG. 14. Here, the display screen in the directory application always has a listing 92, and pop-up data 90 associated with the highlighted contact 70. Holding and moving the activating object in proximity to the display above the listing causes the highlight to move, changing the pop-up data to match the highlighted contact. This allows the user to ensure that the right contact is selected from several ambiguous contacts. Clicking, tapping, or touching the activating object on the highlighted contact brings up the full information screen of FIG. 8, allowing the user to select the required contact method. This embodiment addresses both key disadvantages of the prior art, while being easy and intuitive for the user.

It is a further advantage of this embodiment that movement of the activating object to the upper or lower extremes of the directory list (Reference numeral 92 of FIG. 14) can cause the list to scroll automatically.

It will be realized by those skilled in the art, that the present invention applies to all classes of screen objects, whether they are used in the software application user interface, as part of a the operating system user interface, or in a smart compact device where the software is not structured in this way, but contains a user interface and an enhanced pointing device. It will also be appreciated that the novel use of the combination of an enhanced pointing device and pop-up data greatly enhances the usability of the user interface on a smart compact device, in a way that has not previously been demonstrated.

Alternatively, the behavior of the screen object may be modified by the state information returned by the enhanced pointing device with the X and Y position data, so that more than one control action maybe produced from one control object.

Alternatively, the pop-up data for a screen object may be triggered by a further extended state of the enhanced pointing device, distinct from the base and selected states.

In an illustrative embodiment, the exact method of triggering the pop-up data, the duration of any timings associated with triggering the pop-up data, the range from the display screen that is defined as proximity and the form of any pop-up data will be determined by usability testing so as to maximize the benefit to the user in a given application.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

*A user interface of a smart compact device is provided which includes: a display screen configured to report position information, the display screen adapted to communicate with an activating object disposed in at least one of a touching state and a proximate non-touching state; means configured to display data on the display screen responsive to the activating object being disposed in the proximate non-touching state for a selected time period; and means configured to hide at least a portion of the data responsive to the activating object being disposed in the touching state. The selected time period may be of a duration that ends substantially immediately after the activating object is disposed in the proximate non-touching state, wherein the selected time period may be a short length of time such as approximately one second.*

*The display screen may include an inductive sensing system, and the user interface may employ a ratiometric measurement technique with a plurality of coils that each extend across a sensing area.*

*In an embodiment, the smart compact device displays the data in a window.*

*In another embodiment, once the data has been displayed, touching the activating object to the display screen substantially on the data causes a first action to occur, the first action being different from a second action that would have occurred if the data had not been displayed.*

*In other embodiments, the smart compact device may be a handheld device, the activating object is selected from the group consisting of a finger and a pen, and the display screen is adapted to communicate with an activating object disposed in at least one of the touching state, the proximate non-touching state, and a third state, wherein the third state is a second proximate non-touching state different from the proximate non-touching state.*

*In other embodiments, the data may include textual data, a graphic, a control object, and/or additional data.*

*In other embodiments, the smart compact device may be a personal digital assistant (PDA), a media player, a digital video device, a digital camera, and/or a mobile phone.*

*In other embodiments, the smart compact device executes a SYMBIAN operating system, a LINUX operating system, and/or a WINDOWS operating system.*

*In various embodiment, the hiding means may be configured to completely hide said data, hide the portion of the data by overlaying additional data over the portion of the data, and/or hide the portion of the data by restoring the portion of the display screen previously obscured by the data.*

*A method is provided for presenting and manipulating information in a user interface of a smart compact device including a display screen configured to report position information, the display screen adapted to communicate with an activating object disposed in at least one of a touching state and a proximate non-touching state. The method includes: determining if the activating object is in the proximate non-touching state; displaying data responsive to the activating object being disposed in the proximate non-touching state for a selected time period; and control-*

*ling the data on the display screen to hide second data responsive to the activating object being disposed in the proximate non-touching state.*

*In an embodiment, the selected time period is of length of time that ends substantially immediately after determining if the activating object is in the proximate non-touching state, wherein the selected time period may be a short length of time such as approximately one second.*

*In the method, the display screen may include an inductive sensing system, and the user interface may employ a ratiometric measurement technique with a plurality of coils that each extend across a sensing area.*

*In an embodiment the smart compact device displays the data in a window.*

*In various embodiment, once the data has been displayed, touching the activating object to the display screen substantially on the data causes a first action to occur, the first action being different from a second action that would have occurred if the data had not been displayed.*

*In various embodiments, the smart compact device is a handheld device, the activating object is selected from the group consisting of a finger and a pen, and the display screen is adapted to communicate with an activating object disposed in at least one of the touching state, the proximate non-touching state, and a third state, wherein the third state is a second proximate non-touching state different from the proximate non-touching state.*

*The method may also involve determining if the activating object is in the touching state; and hiding at least a portion of the data if the activating object is in the touching state.*

*In various embodiments of the method, the data may include textual data, a graphic, a control object, and/or additional data.*

*In an embodiment, the controlling step may involve completely hiding the data, overlaying additional data over the portion of the data to thereby hide the data, and/or restoring the portion of the display screen previously obscured by the data to thereby hide the data.*

*A method is also provided for controlling a display of data on a user interface presented on a display screen configured to report position information, the display screen adapted to communicate with an activating object disposed in at least one of a first proximate non-touching state and a second proximate non-touching state; defined by a first and second proximity relationship between the activating object and the display screen, respectively. The method includes sensing a sensed relationship between the activating object and the display screen; determining if the sensed relationship is the first proximity relationship; displaying a first group of data on the display screen following a selected time period if the sensed relationship is the first proximity relationship; determining if the sensed relationship is the second proximity relationship; displaying a second group of data on the display screen if the sensed relationship is the second proximity relationship; and controlling the display screen to hide at least a portion of the second group of data responsive to the activating object being disposed in the first proximity relationship.*

*In an embodiment, the first proximity relationship includes a first function related to a distance between the activating object and the display screen, and the second proximity relationship includes a second function related to the distance between the activating object and the display screen, the second function being different from the first function.*

*In an embodiment, sensing the sensed relationship occurs for a pre-selected period of time.*

*In an embodiment, the second group of data may be displayed a second selected time period after determining if the sensed relationship is the second proximity relationship.*

*In an embodiment, the second proximity relationship includes a user-controlled parameter of the user interface, wherein the user-controlled parameter may be defined by a switch coupled to the activating object, and wherein the switch may be a button.*

*In various embodiments, the controlling step may involve completely hiding said portion of said second group of data, overlaying additional data over the portion of the second group of data to thereby hide the second group of data, and/or restoring at least a portion of the first group of data obscured by the second group of data.*

*A method is also provided for presenting and manipulating information in a user interface of a smart compact device comprising a display screen configured to report position information, the display screen adapted to communicate with an activating object disposed in at least one of a touching state and a proximate non-touching state. The method involves the steps of: determining if the activating object is in the proximate non-touching state; displaying data responsive to the activating object being disposed in the proximate non-touching state for a selected time period; determining if the activating object is in the touching state; and hiding at least a portion of the data if the activating object is in the touching state.*

What is claimed is:

1. A user interface of a smart compact device comprising:

a display screen configured to report position information, said display screen adapted to communicate with an activating object disposed in at least one of a touching state and a proximate non-touching state;

means configured to display data on said display screen responsive to said activating object being disposed in said proximate non-touching state for a selected time period; and means configured to hide at least a portion of said data responsive to said activating object being disposed in said touching state.

2. The user interface of claim 1, wherein said selected time period is of a duration that ends substantially immediately after said activating object is disposed in said proximate non-touching state.

3. The user interface of claim 1, wherein said selected time period is a short length of time.

4. The user interface of claim 3, wherein said short length of time is approximately one second.

5. The user interface of claim 1, wherein said display screen includes an inductive sensing system.

6. The user interface of claim 1, wherein said user interface employs a ratiometric measurement technique with a plurality of coils that each extend across a sensing area.

7. The user interface of claim 1, wherein said smart compact device displays said data in a window.

8. The user interface of claim 1, wherein once said data has been displayed, touching said activating object to said display screen substantially on said data causes a first action to occur, said first action being different from a second action that would have occurred if said data had not been displayed.

9. The user interface of claim 1, wherein said smart compact device is a handheld device.

10. The user interface of claim 1, wherein said activating object is selected from the group consisting of a finger and a pen.

11. The user interface of claim 1, wherein said display screen is adapted to communicate with an activating object disposed in at least one of said touching state, said proximate non-touching state, and a third state.

12. The user interface of claim 11, wherein said third state is a second proximate non-touching state different from said proximate non-touching state.

13. The user interface of claim 1, wherein said data includes textual data.

14. The user interface of claim 1, wherein said data includes a graphic.

15. The user interface of claim 1, wherein said data includes a control object.

16. The user interface of claim 1, wherein said data includes additional data.

17. The user interface of claim 1 wherein said smart compact device is a personal digital assistant (PDA).

18. The user interface of claim 1 wherein said smart compact device is a mobile phone.

19. The user interface of claim 1 wherein said smart compact device is a media player.

20. The user interface of claim 1 wherein said smart compact device is a digital camera.

21. The user interface of claim 1 wherein said smart compact device is a digital video device.

[22. The user interface of claim 1 wherein said smart compact device executes a SYMBIAN operating system.]

[23. The user interface of claim 1 wherein said smart compact device executes a LINUX operating system.]

[24. The user interface of claim 1 wherein said smart compact device executes a WINDOWS operating system.]

25. The user interface of claim 1 wherein said hiding means is configured to completely hide said data.

26. The user interface of claim 1 wherein said hiding means is configured to hide said portion of said data by overlaying additional data over said portion of said data.

27. The user interface of claim 1 wherein said hiding means is configured to hide said portion of said data by restoring the portion of the display screen previously obscured by said data.

28. A method for presenting and manipulating information in a user interface of a smart compact device, comprising a display screen configured to report position information, said display screen adapted to communicate with an activating object disposed in at least one of a touching state and a proximate non-touching state, the method comprising the steps of:

determining if said activating object is in said proximate non-touching state; displaying data responsive to said activating object being disposed in said proximate non-touching state for a selected time period; and controlling said data on said display screen to hide second data responsive to said activating object being disposed in said proximate non-touching state.

29. The method of claim 28, wherein said selected time period is of length of time that ends substantially immediately after said determining if said activating object is in said proximate non-touching state.

30. The method of claim 28, wherein said selected time period is a short length of time.

31. The method of claim 30, wherein said short length of time is approximately one second.

32. The method of claim 28, wherein said display screen includes an inductive sensing system.

33. The method of claim 28, wherein said user interface employs a ratiometric measurement technique with a plurality of coils that each extend across a sensing area.

34. The method of claim 28, wherein said smart compact device displays said data in a [windows] *window*.

35. The method of claim 28, wherein once said data has been displayed, touching said activating object to said display screen substantially on said data causes a first action to occur, said first action being different from a second action that would have occurred if said data had not been displayed.

36. The method of claim 28, wherein [maid] *said* smart compact device is a handheld device.

37. The method of claim 28, wherein said activating object is selected from [tho] *the* group consisting of a finger and a pen.

38. The method of claim 28, wherein said display screen is adapted to communicate with an activating object disposed in at least one of said touching state, said proximate non-touching state, and a third state.

39. The method of claim 38, wherein said third state is a second proximate non-touching state different from said proximate non-touching state.

40. The method of claim 28, further comprising:

determining if said activating object is in said touching state; and hiding at least a portion of said data if said activating object is in said touching state.

41. The method of claim 28, wherein said data includes textual data.

42. The method of claim 28, wherein said data includes a graphic.

43. The method of claim 28, wherein said data includes a control object.

44. The method of claim 28, wherein said data includes additional data.

45. The method of claim 28 wherein said controlling step further comprises completely hiding said data.

46. The method of claim 28 wherein said controlling step comprises overlaying additional data over said portion of said data to thereby hide said data.

47. The method of claim 28 wherein said controlling step comprises restoring the portion of the display screen previously obscured by said data to thereby hide said data.

48. A method for controlling a display of data on a user interface presented on a display screen configured to report position information, said display screen adapted to communicate with an activating object disposed in at least one of a first proximate non-touching state and a second proximate non-touching state; defined by a first and second proximity relationship between said activating object and said display screen, respectively, the method comprising the steps of:

sensing a sensed relationship between said activating object and said display screen;

determining if said sensed relationship is said first proximity relationship;

displaying a first group of data on said display screen following a selected time period if said sensed relationship is said first proximity relationship;

determining if said sensed relationship is said second proximity relationship;

displaying a second group of data on said display screen if said sensed relationship is said second proximity relationship; and controlling said display screen to hide at least a portion of said second group of data responsive to said activating object being disposed in said first proximity relationship.

49. The method of claim 48, wherein said first proximity relationship includes a first function related to a distance between said activating object and said display screen.

50. The method of claim 49, wherein said second proximity relationship includes a second function related to said distance between said activating object and said display screen, said second function being different from said first function.

51. The method of claim 48, wherein said sensing said sensed relationship occurs for a pre-selected period of time.

52. The method of claim 48, wherein said second group of data is displayed a second selected time period after said determining if said sensed relationship is said second proximity relationship.

53. The method of claim 48, wherein said second proximity relationship includes a user-controlled parameter of said user interface.

54. The method of claim 53, wherein said user-controlled parameter is defined by a switch coupled to said activating object.

55. The method of claim 54, wherein said switch is a button.

56. The method of claim 48 wherein said controlling step further comprises completely hiding said portion of said second group of data.

57. The method of claim 48 wherein said controlling step comprises overlaying additional data over said portion of said second group of data to thereby hide said second group of data.

58. The method of claim 48 wherein said controlling step comprises restoring at least a portion of the first group of data obscured by said second group of data.

59. A method for presenting and manipulating information in a user interface of a smart compact device comprising a display screen configured to report position information, said display screen adapted to communicate with an activating object disposed in at least one of a touching state and a proximate non-touching state, the method comprising the steps of:

determining if said activating object is in said proximate non-touching state;

displaying data responsive to said activating object being disposed in said proximate non-touching state for a selected time period;

determining if said activating object is in said touching state; and hiding at least a portion of said data if said activating object is in said touching state.

* * * * *